United States Patent
Zhou et al.

(10) Patent No.: US 12,276,256 B1
(45) Date of Patent: Apr. 15, 2025

(54) WIND TURBINE BLADE INSPECTION SYSTEM AND METHOD BASED ON UNMANNED AERIAL VEHICLE

(71) Applicant: HUANENG ANHUI HUAINING WIND POWER GENERATION CO., LTD., Anhui (CN)

(72) Inventors: Qinghua Zhou, Anqing (CN); Wenqi Tang, Anqing (CN); Chao Xiong, Anqing (CN); Xuanyu Guan, Anqing (CN); Wei Yang, Anqing (CN)

(73) Assignee: HUANENG ANHUI HUAINING WIND POWER GENERATION CO., LTD., Anqing (CN)

( * ) Notice: Subject to any disclaimer, the term of this patent is extended or adjusted under 35 U.S.C. 154(b) by 0 days.

(21) Appl. No.: 18/914,038

(22) Filed: Oct. 11, 2024

(30) Foreign Application Priority Data

Oct. 24, 2023 (CN) .......................... 202311394837.4

(51) Int. Cl.
F03D 17/00 (2016.01)

(52) U.S. Cl.
CPC ....... F03D 17/004 (2023.08); F03D 17/0065 (2023.08); F03D 17/013 (2023.08); F03D 17/028 (2023.08); F05B 2260/80 (2013.01)

(58) Field of Classification Search
CPC ........ F03D 17/00; F03D 80/50; F03D 1/0675; F03D 1/0691; F03D 17/004;

(Continued)

(56) References Cited

U.S. PATENT DOCUMENTS

| 10,598,608 | B2* | 3/2020 | Watanabe | G01N 21/954 |
| 2011/0090110 | A1* | 4/2011 | Tralshawala | G01N 22/02 |
| | | | | 342/25 A |

(Continued)

FOREIGN PATENT DOCUMENTS

| CN | 110554704 A | 12/2019 |
| CN | 112577606 A | 3/2021 |

(Continued)

OTHER PUBLICATIONS

First Office Action in Chinese Application No. 202311394837.4 mailed on Mar. 20, 2024, 20 pages.

(Continued)

*Primary Examiner* — Wesley J Tucker
*Assistant Examiner* — Courtney Joan Nelson
(74) *Attorney, Agent, or Firm* — Porus IP LLC (57) ABSTRACT

The disclosure relates to a wind turbine blade inspection system and method based on an unmanned aerial vehicle. The system includes: a collection module, used for collecting blade data and surrounding environment data of blades to be inspected, determining feature inspection points of the unmanned aerial vehicle according to the blade data and the surrounding environment data, and generating inspection paths; an inspection module, used for shooting corresponding blade at the feature inspection points according to the inspection paths to obtain a first inspection image and a second inspection image; an analysis module, used for receiving the first inspection image and the second inspection image, analyzing the first inspection image and the second inspection image to obtain a health state of the corresponding blade, and making a maintenance plan according to the health state of each of the blades.

5 Claims, 2 Drawing Sheets

(58) Field of Classification Search
CPC .. F03D 17/013; F03D 17/028; F03D 17/0065; H04N 7/183; G06T 2207/10032; G06T 7/20; G06T 2207/30164; G06T 7/0004; G06T 2207/30244; G06T 7/33; G06T 7/55; G06T 7/0002; G06V 20/13; G06V 20/176; G06V 20/17; G06V 20/64; G06V 2201/06; F05B 2260/80

See application file for complete search history.

(56) References Cited

U.S. PATENT DOCUMENTS

2020/0402220 A1    12/2020  Dong et al.
2022/0099067 A1*   3/2022   Packer .................... F03D 17/00

FOREIGN PATENT DOCUMENTS

| | | |
|---|---|---|
| CN | 112598637 A | 4/2021 |
| CN | 112801432 A | 5/2021 |
| CN | 113050693 A | 6/2021 |
| CN | 113324548 A | 8/2021 |
| CN | 114371725 A | 4/2022 |
| CN | 116301049 A | 6/2023 |
| CN | 116360485 A | 6/2023 |
| CN | 116906276 A | 10/2023 |
| CN | 116912715 A | 10/2023 |
| WO | 2023020084 A1 | 2/2023 |

OTHER PUBLICATIONS

Decision to Grant a Patent in Chinese Application No. 202311394837.4 mailed on Apr. 3, 2024, 7 pages.

* cited by examiner

WIND TURBINE BLADE INSPECTION SYSTEM AND METHOD BASED ON UNMANNED AERIAL VEHICLE

CROSS-REFERENCE TO RELATED APPLICATIONS

This application claims priority of Chinese Patent Application No. 202311394837.4, filed on Oct. 24, 2023, the contents of which is hereby incorporated by reference.

TECHNICAL FIELD

The disclosure relates to the technical field of wind turbine blade inspection, in particular to a wind turbine blade inspection system and method based on an unmanned aerial vehicle.

BACKGROUND

Blade is an important component of wind turbine generator unit. Due to the harsh environment in which the wind turbine is located, the blades are damaged by natural factors such as wind sand, rain, snow, thunder and lightning, and so on when running in harsh environment, resulting in defects such as surface shedding, sand holes, lightning strike and blade edge wear. It is necessary to regularly check and maintain the blade to prevent accidents caused by defects, and the application scope of unmanned aerial vehicle (UAV) in inspection work is increasingly extensive. Unmanned aerial vehicle has the characteristics of hovering, low-speed flight, simple operation, convenient maintenance and high cost performance. Therefore, the application of UAV to blade inspection will greatly improve work efficiency.

In the prior art, the inspection of blades mostly relies on manual operation of unmanned aerial vehicles, due to the limitation of manual operation technology, it is impossible to shoot wind turbine blades in all directions. Moreover, due to the influence of manual operation or external factors, unmanned aerial vehicles are prone to serious impact consequences, with low inspection efficiency, high manual labor intensity and great danger.

SUMMARY

In order to solve the above technical problems, the disclosure provides a wind turbine blade inspection system and method based on an unmanned aerial vehicle. The target rotating area of the blade to be inspected is determined according to collected blade data and surrounding environment data of the blade to be inspected, multiple first inspection points and second inspection points are set according to the target rotating area, a first feature inspection point and a second feature inspection point with the clearest shot image are screening out from multiple first inspection points and the second inspection points, the first feature inspection point and the second feature inspection point of the blades to be inspected are marked in a corresponding first blade space coordinate system. According to the inspection sequence of wind turbine blades, the inspection path of unmanned aerial vehicle is made, and the UAV shoots the blades to be inspected according to the inspection path to obtain the first inspection image and the second inspection image. The health state of the blades is analyzed according to the first inspection image and the second inspection image, and the corresponding maintenance plan is made according to the health state, aiming at solving the technical problems that the UAV is prone to serious impact consequences, low inspection efficiency, high labor intensity and great danger due to manual operation reasons or external factors.

In some embodiments of the disclosure, a wind turbine blade inspection system based on an unmanned aerial vehicle is provided, including:

a collection module, used for collecting blade data and surrounding environment data of blades to be inspected, determining feature inspection points of the unmanned aerial vehicle according to the blade data and the surrounding environment data, and generating inspection paths based on the feature inspection points;

an inspection module, used for shooting corresponding blade at the feature inspection points according to the inspection paths to obtain a first inspection image and a second inspection image;

an analysis module, used for receiving the first inspection image and the second inspection image, analyzing the first inspection image and the second inspection image to obtain a health state of the corresponding blade, and making a maintenance plan according to the health state of each of the blades.

In some embodiments of the disclosure, collecting blade data and surrounding environment data of blades to be inspected includes:

the blade data includes a hub height and a blade tip radius of each of the blades to be inspected, a first blade space coordinate system is established according to the hub height and a hub center point, and a first rotating area of each of the blades to be inspected is determined according to the blade tip radius;

the surrounding environment data includes wind speed data, weather data and obstacle data, an instantaneous wind speed is determined according to the wind speed data, first correction is performed on the first rotating area according to the instantaneous wind speed, a weather condition in a preset period is predicted according to the weather data, and an obstructed frequency corresponding each of the blades to be inspected is determined according to the obstacle data;

second correction is performed on the first rotating area according to the weather condition and the obstructed frequency, to obtain a target rotating area.

In some embodiments of the disclosure, the first correction being performed on the first rotating area according to the instantaneous wind speed includes:

historical wind speed data is obtained, a historical wind speed-rotating area mapping table is determined according to the historical wind speed data, a first historical wind speed is determined according to the first rotating area, the first historical wind speed is compared with current instantaneous wind speed, if the instantaneous wind speed is not greater than the first historical wind speed, a first correction coefficient is selected to perform first correction on the first rotating area;

if the instantaneous wind speed is greater than the first historical wind speed, an instantaneous rotating area corresponding to the instantaneous wind speed in the historical wind speed-rotating area mapping table is determined, an area difference value between the instantaneous rotating area and the first rotating area is calculated, a wind speed difference value between the instantaneous wind speed and the first historical wind speed is calculated, a second correction coefficient is determined according to a ratio of the wind speed difference value to the area difference value, and first correction is performed on the first rotating area according to the second correction coefficient.

In some embodiments of the disclosure, second correction being performed on the first rotating area according to the weather condition and the obstructed frequency includes:

a historical weather-rotating area mapping table is determined according to the weather data, a corresponding weather rotating area is determined according to predicted weather condition, and a weather weight coefficient is determined according to predicted probability value of weather condition and the weather rotating area;

a historical obstacle-rotating area mapping table is determined according to the obstacle data, and the obstructed frequency of current each of the blades to be inspected in a preset time period is determined; if the obstructed frequency is greater than a preset obstacle frequency, multiple rotating areas corresponding to historical obstacle in a preset time period are determined based on the historical obstacle-rotating area mapping table, a rotating area average value is calculated, and an obstacle weight coefficient is determined according to the rotating area average value and the obstructed frequency;

a third correction coefficient is determined according to the weather weight coefficient and the obstacle weight coefficient, and second correction is performed on the first rotating area according to the third correction coefficient to obtain the target rotating area.

In some embodiments of the disclosure, determining feature inspection points of the unmanned aerial vehicle according to the blade data and the surrounding environment data includes:

multiple first inspection points and multiple second inspection points of the unmanned aerial vehicle are determined on the first blade space coordinate system based on the target rotating area of each of the blades to be inspected, where the first inspection points and the second inspection points are respectively arranged at two sides of each of the blades to be inspected, and the first inspection points and the second inspection points are set at a preset shooting inclination angle;

inspection images of multiple first inspection points and the second inspection points are obtained, preprocessing is performed on the inspection images, recognition rate and accuracy rate of feature positions in preprocessed inspection images are obtained, and a first feature shooting inclination angle and a second feature shooting inclination angle are determined according to the recognition rate and accuracy rate;

a first inspection point corresponding to the first feature shooting inclination angle is set as a first feature inspection point, and a second inspection point corresponding to the second feature shooting inclination angle is set as a second feature inspection point.

In some embodiments of the disclosure, the shooting corresponding blade at the feature inspection points according to the inspection paths to obtain a first inspection image and a second inspection image includes:

space coordinates of each of the blades to be inspected is obtained, and an inspection sequence of the blades to be inspected is formulated according to the space coordinates, where the inspection sequence sets the blades to be inspected as a first blade to be inspected, a second blade to be inspected, . . . , and an n-th blade to be inspected;

according to the first feature inspection point and the second feature inspection point corresponding to the first blade to be inspected, the second blade to be inspected, . . . and the n-th blade to be inspected, a first inspection path, a second inspection path, . . . , and an n-th inspection path of the unmanned aerial vehicle are formed, and the first inspection path, the second inspection path, . . . , and the n-th inspection path are drawn on the first blade space coordinate system to obtain inspection space coordinates of the unmanned aerial vehicle, and the unmanned aerial vehicle shoots corresponding blade according to the inspection space coordinates;

the first inspection image is a first shot image and a first infrared image, and the second inspection image is a second shot image and a second infrared image.

In some embodiments of the disclosure, the analyzing the first inspection image and the second inspection image to obtain health state of corresponding blade includes:

feature images corresponding to the feature positions are divided according to the first shot image and the second shot image, and the feature images are input into a trained blade state model to obtain a first state;

a three-dimensional model corresponding to each of the blades to be inspected is constructed according to the first shot image and the second shot image, image fusion is performed on the first infrared image and the second infrared image and the three-dimensional model to obtain a three-dimensional infrared model, and a temperature distribution of corresponding blade is determined;

according to the temperature distribution of the blade, a second state of the corresponding blade is determined;

the first state and the second state are quantized to obtain a first state quantized value and a second state quantized value, a health state coefficient is determined according to the first state quantized value and the second state quantized value and corresponding weight coefficient, and the health state of the corresponding blade is obtained according to the health state coefficient;

where the health state coefficient is: $K=a1\times n1+a2\times n2$;

where K is the health state coefficient, a1 is the first state quantized value, n1 is a weight coefficient corresponding to the first state quantized value, a2 is the second state quantized value, and n2 is a weight coefficient corresponding to the second state quantized value.

In some embodiments of the disclosure, the making a maintenance plan according to the health state of the blade includes:

a first preset health state coefficient and a second preset health state coefficient are preset, where the first preset health state coefficient is smaller than the second preset health state coefficient, the health state of the corresponding blade is determined according to a relationship between the health state coefficient, and the first preset health state coefficient, the second preset health state coefficient, and the maintenance plan is made according to the health state;

where when the health state coefficient is less than the first preset health state coefficient, a health state of corresponding blade is determined to be an unhealthy state, and a maintenance plan is made to stop and replace the corresponding blade;

when the health state coefficient is between the first preset health state coefficient and the second preset health state coefficient, a health state of corresponding blade is determined to be a sub-health state, and a maintenance plan is made to increase an inspection frequency of corresponding blade;

when the health state coefficient is greater than the second preset health state coefficient, a health state of corresponding blade is determined to be a healthy state, and a maintenance plan is not made.

In some embodiments of the disclosure, a wind turbine blade inspection method based on an unmanned aerial vehicle is provided and includes:

collecting blade data and surrounding environment data of blades to be inspected, determining feature inspection points of the unmanned aerial vehicle according to the blade data and the surrounding environment data, and generating inspection paths based on the feature inspection points;

shooting corresponding blade at the feature inspection points according to the inspection paths to obtain a first inspection image and a second inspection image;

receiving the first inspection image and the second inspection image, analyzing the first inspection image and the second inspection image to obtain a health state of the corresponding blade, and making a maintenance plan according to the health state of each of the blades.

Compared with the prior art, a wind turbine blade inspection system and method based on unmanned aerial vehicles in the embodiment of the disclosure have the following beneficial effects.

The target rotating area of the blade to be inspected is determined according to collected blade data and surrounding environment data of the blade to be inspected, multiple first inspection points and second inspection points are set according to the target rotating area, a first feature inspection point and a second feature inspection point with the clearest shot image are screening out from multiple first inspection points and the second inspection points, the first feature inspection point and the second feature inspection point of the blades to be inspected are marked in a corresponding first blade space coordinate system. According to the inspection sequence of wind turbine blades, the inspection paths of unmanned aerial vehicle are made, and the UAV shoots the blades to be inspected according to the inspection paths to obtain the first inspection image and the second inspection image. The health state of the blades is analyzed according to the first inspection image and the second inspection image, and the corresponding maintenance plan is made according to the health state, aiming at solving the technical problems that the UAV is prone to serious impact consequences, low inspection efficiency, high labor intensity and great danger due to manual operation reasons or external factors.

DETAILED DESCRIPTION OF THE EMBODIMENTS

In the following, the specific embodiments of the disclosure will be described in further detail in combination with the attached drawings and embodiments. The following embodiments are intended to illustrate the disclosure, but are not intended to limit the scope of the disclosure.

In the description of the disclosure, it should be understood that the azimuth or positional relationship indicated by the terms "center", "up", "down", "front", "back", "left", "right", "vertical", "horizontal", "top", "bottom", "inside" and "outside" is based on the azimuth or positional relationship shown in the attached drawings, and is only for the convenience of describing the disclosure and simplifying the description, and does not indicate or imply that the referred device or element must have a specific orientation, be constructed and operated in a specific orientation, so it cannot be understood as a limitation of the disclosure.

The terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of the disclosure, unless otherwise specified, "multiple" means two or more.

In the description of the disclosure, it should be noted that unless otherwise specified and limited, the terms "installation", "connect" and "connection" should be broadly understood, for example, they can be fixed connection, can also be detachable connection or integral connection; they can be a mechanical connection or an electrical connection; they can be directly connected, can also be indirectly connected through an intermediate medium, and can be internal communication between two elements. For those skilled in the art, meanings of the above terms in the disclosure can be understood according to specific situations.

Figure 1:
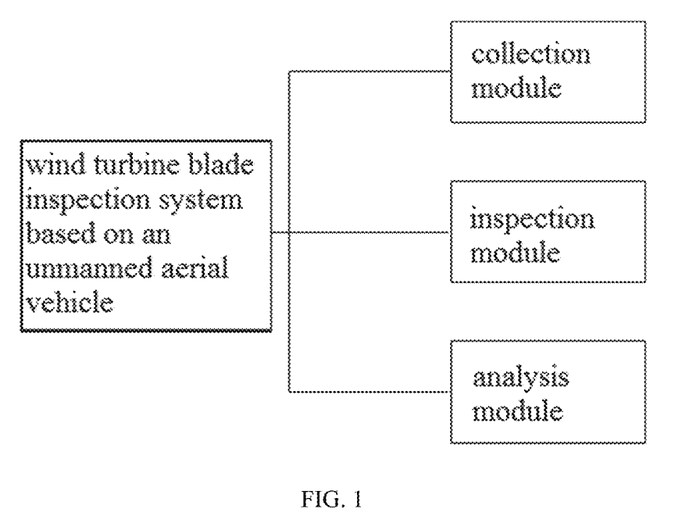
FIG. 1 is a schematic diagram of a wind turbine blade inspection system based on an unmanned aerial vehicle according to a preferred embodiment of the embodiment of the disclosure.

As shown in FIG. 1, a wind turbine blade inspection system based on an unmanned aerial vehicle is provided according to a preferred embodiment of the embodiment of the disclosure, and includes:

a collection module, used for collecting blade data and surrounding environment data of blades to be inspected, determining feature inspection points of the unmanned aerial vehicle according to the blade data and the surrounding environment data, and generating inspection paths based on the feature inspection points;

an inspection module, used for shooting corresponding blade at the feature inspection points according to the inspection paths to obtain a first inspection image and a second inspection image;

an analysis module, used for receiving the first inspection image and the second inspection image, analyzing the first inspection image and the second inspection image to obtain a health state of the corresponding blade, and making a maintenance plan according to the health state of each of the blades.

In this embodiment, the UAV has two feature inspection points for each blade to be inspected, namely, the first feature inspection point and the second feature inspection point, which are arranged on the left and right sides of the corresponding blade, so that the complete image of the corresponding blade can be shot, and the UAV moves from the first feature inspection point to the second feature inspection point as a one-time inspection path.

In this embodiment, the UAV is equipped with an infrared thermal imager, the first inspection image is the first shot image and the first infrared image of the first feature inspection point, and the second inspection image is the second shot image and the second infrared image of the second feature inspection point.

In this embodiment, the rotating range of the blade to be inspected is determined by the blade data and the surrounding environment data of the blade to be inspected, and the feature inspection point of the UAV is set at the nearest place outside the rotating range, so that the collision between the UAV and the blade is avoided under the condition of ensuring the clarity and completeness of blade shooting, and these are automatically set without manual operation, which greatly reduces the manual intensity and ensures the safety and efficiency of the inspection system.

In some embodiments of the disclosure, collecting blade data and surrounding environment data of blades to be inspected includes:

the blade data includes a hub height and a blade tip radius of each of the blades to be inspected, a first blade space coordinate system is established according to the hub height and a hub center point, and a first rotating area of each of the blades to be inspected is determined according to the blade tip radius;

the surrounding environment data includes wind speed data, weather data and obstacle data, an instantaneous wind speed is determined according to the wind speed data, first correction is performed on the first rotating area according to the instantaneous wind speed, a weather condition in a preset period is predicted according to the weather data, and an obstructed frequency corresponding each of the blades to be inspected is determined according to the obstacle data;

second correction is performed on the first rotating area according to the weather condition and the obstructed frequency, to obtain a target rotating area.

In this embodiment, the rotating area of the wind turbine blade is influenced by weather, wind speed and obstacles, etc. The rotating area is corrected according to the weather, wind speed and obstacles to obtain an accurate rotating area of the blade, and the target rotating area is specifically the dynamic range of the wind turbine blade. After determining the dynamic range of the wind turbine blade, the inspection point of the UAV, that is, the closest point outside the dynamic range, is determined, thus solving the technical problem that the UAV is prone to serious impact consequences due to manual operation or external factors.

In some embodiments of the disclosure, the first correction being performed on the first rotating area according to the instantaneous wind speed includes:

historical wind speed data is obtained, a historical wind speed-rotating area mapping table is determined according to the historical wind speed data, a first historical wind speed is determined according to the first rotating area, the first historical wind speed is compared with current instantaneous wind speed, if the instantaneous wind speed is not greater than the first historical wind speed, a first correction coefficient is selected to perform first correction on the first rotating area;

if the instantaneous wind speed is greater than the first historical wind speed, an instantaneous rotating area corresponding to the instantaneous wind speed in the historical wind speed-rotating area mapping table is determined, an area difference value between the instantaneous rotating area and the first rotating area is calculated, a wind speed difference value between the instantaneous wind speed and the first historical wind speed is calculated, a second correction coefficient is determined according to a ratio of the wind speed difference value to the area difference value, and first correction is performed on the first rotating area according to the second correction coefficient.

In this embodiment, the first correction coefficient is 1, that is, the rotating area is not modified, and the second correction coefficient is determined according to the ratio of the real-time wind speed difference value and the area difference value, and the first rotating area of the blade is performed first correction, thus improving the accuracy of the dynamic range of the blade.

In some embodiments of the disclosure, second correction being performed on the first rotating area according to the weather condition and the obstructed frequency includes:

a historical weather-rotating area mapping table is determined according to the weather data, a corresponding weather rotating area is determined according to predicted weather condition, and a weather weight coefficient is determined according to predicted probability value of weather condition and the weather rotating area;

a historical obstacle-rotating area mapping table is determined according to the obstacle data, and the obstructed frequency of current each of the blades to be inspected in a preset time period is determined; if the obstructed frequency is greater than a preset obstacle frequency, multiple rotating areas corresponding to historical obstacle in a preset time period are determined based on the historical obstacle-rotating area mapping table, a rotating area average value is calculated, and an obstacle weight coefficient is determined according to the rotating area average value and the obstructed frequency;

a third correction coefficient is determined according to the weather weight coefficient and the obstacle weight coefficient, and second correction is performed on the first rotating area according to the third correction coefficient to obtain the target rotating area.

In this embodiment, the weather condition includes rainy days, windy days, snowy days and foggy days, the historical weather-rotating area mapping table is historical weather condition and historical rotating area of corresponding blade, the historical rotating area of blade corresponding to weather condition is set as the weather rotating area, the weather weight coefficient is the product of the predicted probability value and the weather rotating area, and the historical obstacle-rotating area mapping table is specifically historical obstacles and historical rotating area of corresponding blade. According to the historical rotating area of different obstacles and corresponding blade, the rotating area average value is calculated, the obstacle weight coefficient is determined by the product of the rotating area average value and the obstructed frequency, and the third correction coefficient is set according to the average value of the obstacle weight coefficient and the weather weight coefficient, which greatly improves the accuracy of the dynamic range of blades.

In some embodiments of the disclosure, determining feature inspection points of the unmanned aerial vehicle according to the blade data and the surrounding environment data includes:

multiple first inspection points and multiple second inspection points of the unmanned aerial vehicle are determined on the first blade space coordinate system based on the target rotating area of each of the blades to be inspected, where the first inspection points and the second inspection points are respectively arranged at two sides of each of the blades to be inspected, and the first inspection points and the second inspection points are set at a preset shooting inclination angle;

inspection images of multiple first inspection points and the second inspection points are obtained, preprocessing is performed on the inspection images, recognition rate and accuracy rate of feature positions in preprocessed inspection images are obtained, and a first feature shooting inclination angle and a second feature shooting inclination angle are determined according to the recognition rate and accuracy rate;

a first inspection point corresponding to the first feature shooting inclination angle is set as a first feature inspection point, and a second inspection point corresponding to the second feature shooting inclination angle is set as a second feature inspection point.

In this embodiment, the preset shooting inclination angle is set according to the historical shooting angle, the feature position is set according to the frequency of the historical fault position of the blade, and the recognition rate is the recognition area of the feature position. The larger the recognition area, the higher the recognition rate, the more accurate the feature position and the higher the accuracy, thus determining the first feature inspection point on the left side and the second feature inspection point on the right side of the blade.

In some embodiments of the disclosure, shooting corresponding blade at the feature inspection points according to the inspection paths to obtain a first inspection image and a second inspection image includes:

space coordinates of each of the blades to be inspected is obtained, and an inspection sequence of the blades to be inspected is formulated according to the space coordinates, where the inspection sequence sets the blades to be inspected as a first blade to be inspected, a second blade to be inspected, . . . , and an n-th blade to be inspected;

according to the first feature inspection point and the second feature inspection point corresponding to the first blade to be inspected, the second blade to be inspected, . . . , and the n-th blade to be inspected, a first inspection path, a second inspection path, . . . , and an n-th inspection path of the unmanned aerial vehicle are formed, and the first inspection path, the second inspection path, . . . , and the n-th inspection path are drawn on the first blade space coordinate system to obtain inspection space coordinates of the unmanned aerial vehicle, and the unmanned aerial vehicle shoots corresponding blade according to the inspection space coordinates;

the first inspection image is a first shot image and a first infrared image, and the second inspection image is a second shot image and a second infrared image.

In this embodiment, the inspection sequence is set according to the space coordinates of the blades to be inspected. The first feature inspection point to the second feature inspection point of the first blade to be inspected is the first inspection path, and there are corresponding inspection paths from the first blade to be inspected to the n-th blade to be inspected. The inspection paths are drawn into the first blade space coordinate system to obtain the inspection space coordinates, which are input into the UAV according to the inspection sequence, and the UAV shoots the corresponding blades according to the inspection space coordinates, the first blade space coordinate system is constructed with the mapping point from the hub center point of the first blade to be inspected to the ground as the original point.

In some embodiments of the disclosure, analyzing the first inspection image and the second inspection image to obtain health state of corresponding blade includes:

feature images corresponding to the feature positions are divided according to the first shot image and the second shot image, and the feature images are input into a trained blade state model to obtain a first state;

a three-dimensional model corresponding to each of the blades to be inspected is constructed according to the first shot image and the second shot image, image fusion is performed on the first infrared image and the second infrared image and the three-dimensional model to obtain a three-dimensional infrared model, and a temperature distribution of corresponding blade is determined;

according to the temperature distribution of the blade, a second state of the corresponding blade is determined;

the first state and the second state are quantized to obtain a first state quantized value and a second state quantized value, a health state coefficient is determined according to the first state quantized value and the second state quantized value and corresponding weight coefficient, and the health state of the corresponding blade is obtained according to the health state coefficient;

where the health state coefficient is: $K = a1 \times n1 + a2 \times n2$;

where K is the health state coefficient, a1 is the first state quantized value, n1 is a weight coefficient corresponding to the first state quantized value, a2 is the second state quantized value, and n2 is a weight coefficient corresponding to the second state quantized value.

In this embodiment, the first state and the second state include good, normal and bad, with the quantized value corresponding to the good state being 1, the quantized value corresponding to the normal state being 0.7 and the quantized value corresponding to the bad state being 0.3.

In some embodiments of the disclosure, making a maintenance plan according to the health state of the blade includes:

a first preset health state coefficient and a second preset health state coefficient are preset, where the first preset health state coefficient is smaller than the second preset health state coefficient, the health state of the corresponding blade is determined according to a relationship between the health state coefficient, and the first preset health state coefficient, the second preset health state coefficient, and the maintenance plan is made according to the health state;

where when the health state coefficient is less than the first preset health state coefficient, a health state of corresponding blade is determined to be an unhealthy state, and a maintenance plan is made to stop and replace the corresponding blade;

when the health state coefficient is between the first preset health state coefficient and the second preset health state coefficient, a health state of corresponding blade is determined to be a sub-health state, and a maintenance plan is made to increase an inspection frequency of corresponding blade;

when the health state coefficient is greater than the second preset health state coefficient, a health state of corresponding blade is determined to be a healthy state, and a maintenance plan is not made.

Figure 2:
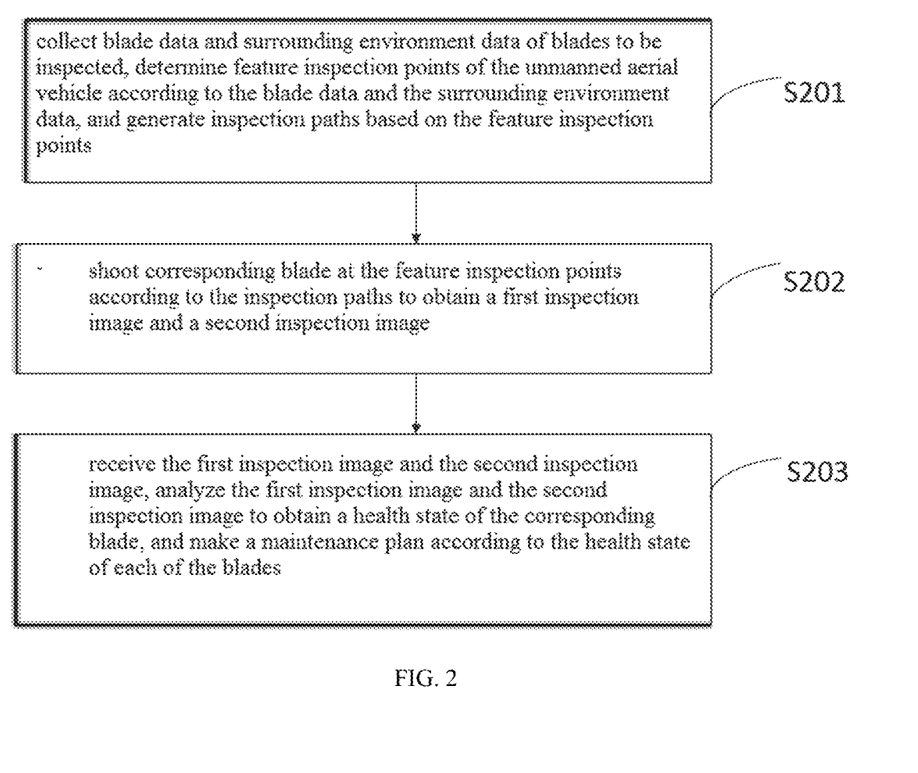
FIG. 2 is a schematic flow diagram of a wind turbine blade inspection method based on unmanned aerial vehicle according to a preferred embodiment of the embodiment of the disclosure.

In some embodiments of the disclosure, as shown in FIG. 2, a wind turbine blade inspection method based on an unmanned aerial vehicle is provided and includes:

step S201: blade data and surrounding environment data of blades to be inspected are collected, feature inspection points of the unmanned aerial vehicle are determined according to the blade data and the surrounding environment data, and inspection paths are generated based on the feature inspection points;

step S202: corresponding blade is shot at the feature inspection points according to the inspection paths to obtain a first inspection image and a second inspection image;

step S203: the first inspection image and the second inspection image are received, the first inspection image and the second inspection image are analyzed to obtain a health state of the corresponding blade, and a maintenance plan is made according to the health state of each of the blades.

To sum up, a wind turbine blade inspection system and method based on unmanned aerial vehicles in the embodiment of the disclosure is provided. The target rotating area of the blade to be inspected is determined according to collected blade data and surrounding environment data of the blade to be inspected, multiple first inspection points and second inspection points are set according to the target rotating area, a first feature inspection point and a second feature inspection point with the clearest shot image are screening out from multiple first inspection points and the second inspection points, the first feature inspection point and the second feature inspection point of the blades to be inspected are marked in a corresponding first blade space coordinate system. According to the inspection sequence of wind turbine blades, the inspection paths of unmanned aerial vehicle are made, and the UAV shoots the blades to be inspected according to the inspection paths to obtain the first inspection image and the second inspection image. The health state of the blades is analyzed according to the first inspection image and the second inspection image, and the corresponding maintenance plan is made according to the health state, aiming at solving the technical problems that the UAV is prone to serious impact consequences, low inspection efficiency, high labor intensity and great danger due to manual operation reasons or external factors.

What has been described above is only the preferred embodiment of this disclosure, and it should be pointed out that for those skilled in the art, several improvements and substitutions can be made without departing from the technical principles of this disclosure, and these improvements and substitutions should also be regarded as the protection scope of this disclosure.

What is claimed is:

1. A wind turbine blade inspection system based on an unmanned aerial vehicle, comprising: a processor, a camera, an infrared thermal imager, and a sensor, wherein, the camera, the infrared thermal imager, and the sensor are used for collecting blade data and surrounding environment data of blades to be inspected, and wherein the processor is used for determining feature inspection points of the unmanned aerial vehicle according to the blade data and the surrounding environment data, and generating inspection paths based on the feature inspection points;

the camera is used for shooting corresponding blade at the feature inspection points according to the inspection paths to obtain a first inspection image and a second inspection image;

the processor is further used for receiving the first inspection image and the second inspection image, analyzing the first inspection image and the second inspection image to obtain a health state of the corresponding blade, and making a maintenance plan according to the health state of each of the blades;

wherein the collecting blade data and surrounding environment data of blades to be inspected comprises:

the blade data comprises a hub height and a blade tip radius of each of the blades to be inspected, a first blade space coordinate system is established according to the hub height and a hub center point, and a first rotating area of each of the blades to be inspected is determined according to the blade tip radius;

the surrounding environment data comprises wind speed data, weather data and obstacle data, an instantaneous wind speed is determined according to the wind speed data, first correction is performed on the first rotating area according to the instantaneous wind speed, a weather condition in a preset period is predicted according to the weather data, and an obstructed frequency corresponding each of the blades to be inspected is determined according to the obstacle data;

second correction is performed on the first rotating area according to the weather condition and the obstructed frequency, to obtain a target rotating area;

wherein the first correction being performed on the first rotating area according to the instantaneous wind speed comprises:

historical wind speed data is obtained, a historical wind speed-rotating area mapping table is determined according to the historical wind speed data, a first historical wind speed is determined according to the first rotating area, the first historical wind speed is compared with current instantaneous wind speed, if the instantaneous wind speed is not greater than the first historical wind speed, a first correction coefficient is selected to perform first correction on the first rotating area, and if the instantaneous wind speed is greater than the first historical wind speed, an instantaneous rotating area corresponding to the instantaneous wind speed in the historical wind speed-rotating area mapping table is determined, an area difference value between the instantaneous rotating area and the first rotating area is calculated, a wind speed difference value between the instantaneous wind speed and the first historical wind speed is calculated, a second correction coefficient is determined according to a ratio of the wind speed difference value to the area difference value, and first correction is performed on the first rotating area according to the second correction coefficient;

wherein second correction being performed on the first rotating area according to the weather condition and the obstructed frequency comprises:

a historical weather-rotating area mapping table is determined according to the weather data, a corresponding weather rotating area is determined according to predicted weather condition, and a weather weight coefficient is determined according to predicted probability value of weather condition and the weather rotating area;

a historical obstacle-rotating area mapping table is determined according to the obstacle data, and the obstructed frequency of current each of the blades to be inspected in a preset time period is determined; if the obstructed frequency is greater than a preset obstacle frequency, a plurality of rotating areas corresponding to historical obstacle in a preset time period are determined based on the historical obstacle-rotating area mapping table, a rotating area average value is calculated, and an obstacle weight coefficient is determined according to the rotating area average value and the obstructed frequency;

a third correction coefficient is determined according to the weather weight coefficient and the obstacle weight coefficient, and second correction is performed on the first rotating area according to the third correction coefficient to obtain the target rotating area;

wherein determining feature inspection points of the unmanned aerial vehicle according to the blade data and the surrounding environment data comprises:

a plurality of first inspection points and a plurality of second inspection points of the unmanned aerial vehicle are determined on the first blade space coordinate system based on the target rotating area of each of the blades to be inspected, wherein the first inspection points and the second inspection points are respectively arranged at two sides of each of the blades to be inspected, and the first inspection points and the second inspection points are set at a preset shooting inclination angle;

inspection images of the plurality of first inspection points and the second inspection points are obtained, preprocessing is performed on the inspection images, recognition rate and accuracy rate of feature positions in preprocessed inspection images are obtained, and a first feature shooting inclination angle and a second feature shooting inclination angle are determined according to the recognition rate and accuracy rate;

a first inspection point corresponding to the first feature shooting inclination angle is set as a first feature inspection point, and a second inspection point corresponding to the second feature shooting inclination angle is set as a second feature inspection point.

2. The wind turbine blade inspection system based on an unmanned aerial vehicle according to claim 1, wherein the shooting corresponding blade at the feature inspection points according to the inspection paths to obtain a first inspection image and a second inspection image comprises:

space coordinates of each of the blades to be inspected is obtained, and an inspection sequence of the blades to be inspected is formulated according to the space coordinates, wherein the inspection sequence sets the blades to be inspected as a first blade to be inspected, a second blade to be inspected, . . . , and an n-th blade to be inspected;

according to the first feature inspection point and the second feature inspection point corresponding to the first blade to be inspected, the second blade to be inspected, . . . , and the n-th blade to be inspected, a first inspection path, a second inspection path, . . . , and an n-th inspection path of the unmanned aerial vehicle are formed, and the first inspection path, the second inspection path, . . . , and the n-th inspection path are drawn on the first blade space coordinate system to obtain inspection space coordinates of the unmanned aerial vehicle, and the unmanned aerial vehicle shoots corresponding blade according to the inspection space coordinates;

the first inspection image is a first shot image and a first infrared image, and the second inspection image is a second shot image and a second infrared image.

3. The wind turbine blade inspection system based on an unmanned aerial vehicle according to claim 2, wherein the analyzing the first inspection image and the second inspection image to obtain health state of corresponding blade comprises:

feature images corresponding to the feature positions are divided according to the first shot image and the second shot image, and the feature images are input into a trained blade state model to obtain a first state;

a three-dimensional model corresponding to each of the blades to be inspected is constructed according to the first shot image and the second shot image, image fusion is performed on the first infrared image and the second infrared image and the three-dimensional model to obtain a three-dimensional infrared model, and a temperature distribution of corresponding blade is determined;

according to the temperature distribution of the blade, a second state of the corresponding blade is determined;

the first state and the second state are quantized to obtain a first state quantized value and a second state quantized value, a health state coefficient is determined according to the first state quantized value and the second state quantized value and corresponding weight coefficient, and the health state of the corresponding blade is obtained according to the health state coefficient;

wherein the health state coefficient is: $K=a1 \times n1+a2 \times n2$;

wherein K is the health state coefficient, a1 is the first state quantized value, n1 is a weight coefficient corresponding to the first state quantized value, a2 is the second state quantized value, and n2 is a weight coefficient corresponding to the second state quantized value.

4. The wind turbine blade inspection system based on an unmanned aerial vehicle according to claim 1, wherein making a maintenance plan according to the health state of the blade comprises:

a first preset health state coefficient and a second preset health state coefficient are preset, wherein the first preset health state coefficient is smaller than the second preset health state coefficient, the health state of the corresponding blade is determined according to a relationship between the health state coefficient, and the first preset health state coefficient, the second preset health state coefficient, and the maintenance plan is made according to the health state;

wherein when the health state coefficient is less than the first preset health state coefficient, a health state of corresponding blade is determined to be an unhealthy state, and a maintenance plan is made to stop and replace the corresponding blade;

when the health state coefficient is between the first preset health state coefficient and the second preset health state coefficient, a health state of corresponding blade is determined to be a sub-health state, and a maintenance plan is made to increase an inspection frequency of corresponding blade;

when the health state coefficient is greater than the second preset health state coefficient, a health state of corresponding blade is determined to be a healthy state, and a maintenance plan is not made.

5. A wind turbine blade inspection method based on an unmanned aerial vehicle, comprising:

collecting blade data and surrounding environment data of blades to be inspected, determining feature inspection points of the unmanned aerial vehicle according to the blade data and the surrounding environment data, and generating inspection paths based on the feature inspection points;

shooting corresponding blade at the feature inspection points according to the inspection paths to obtain a first inspection image and a second inspection image;

receiving the first inspection image and the second inspection image, analyzing the first inspection image and the second inspection image to obtain a health state of the corresponding blade, and making a maintenance plan according to the health state of each of the blades;

wherein the collecting blade data and surrounding environment data of blades to be inspected comprises:

wherein the blade data comprises a hub height and a blade tip radius of each of the blades to be inspected, establishing a first blade space coordinate system according to the hub height and a hub center point, and determining a first rotating area of each of the blades to be inspected according to the blade tip radius;

wherein the surrounding environment data comprises wind speed data, weather data and obstacle data, determining an instantaneous wind speed according to the wind speed data, performing first correction on the first rotating area according to the instantaneous wind speed, predicting a weather condition in a preset period according to the weather data, and determining an obstructed frequency corresponding each of the blades to be inspected according to the obstacle data;

performing second correction on the first rotating area according to the weather condition and the obstructed frequency, to obtain a target rotating area;

wherein the first correction being performed on the first rotating area according to the instantaneous wind speed comprises:

obtaining historical wind speed data, determining a historical wind speed-rotating area mapping table according to the historical wind speed data, determining a first historical wind speed according to the first rotating area, comparing the first historical wind speed with current instantaneous wind speed, wherein if the instantaneous wind speed is not greater than the first historical wind speed, selecting a first correction coefficient to perform first correction on the first rotating area, and if the instantaneous wind speed is greater than the first historical wind speed, determining an instantaneous rotating area corresponding to the instantaneous wind speed in the historical wind speed-rotating area mapping table, calculating an area difference value between the instantaneous rotating area and the first rotating area, calculating a wind speed difference value between the instantaneous wind speed and the first historical wind speed, determining a second correction coefficient according to a ratio of the wind speed difference value to the area difference value, and performing first correction on the first rotating area according to the second correction coefficient;

wherein performing second correction on the first rotating area according to the weather condition and the obstructed frequency comprises:

determining a historical weather-rotating area mapping table according to the weather data, determining a corresponding weather rotating area according to predicted weather condition, and determining a weather weight coefficient according to predicted probability value of weather condition and the weather rotating area;

determining a historical obstacle-rotating area mapping table according to the obstacle data, and determining the obstructed frequency of current each of the blades to be inspected in a preset time period; wherein if the obstructed frequency is greater than a preset obstacle frequency, determining a plurality of rotating areas corresponding to historical obstacle in a preset time period based on the historical obstacle-rotating area mapping table, calculating a rotating area average value, and determining an obstacle weight coefficient according to the rotating area average value and the obstructed frequency;

determining a third correction coefficient according to the weather weight coefficient and the obstacle weight coefficient, and performing second correction on the first rotating area according to the third correction coefficient to obtain the target rotating area;

wherein determining feature inspection points of the unmanned aerial vehicle according to the blade data and the surrounding environment data comprises:

determining a plurality of first inspection points and a plurality of second inspection points of the unmanned aerial vehicle on the first blade space coordinate system based on the target rotating area of each of the blades to be inspected, wherein the first inspection points and the second inspection points are respectively arranged at two sides of each of the blades to be inspected, and the first inspection points and the second inspection points are set at a preset shooting inclination angle;

obtaining inspection images of the plurality of first inspection points and the second inspection points, performing preprocessing on the inspection images, obtaining recognition rate and accuracy rate of feature positions in preprocessed inspection images, and determining a first feature shooting inclination angle and a second feature shooting inclination angle according to the recognition rate and accuracy rate;

setting a first inspection point corresponding to the first feature shooting inclination angle as a first feature inspection point, and setting a second inspection point corresponding to the second feature shooting inclination angle as a second feature inspection point.

* * * * *